US011710312B2

(12) United States Patent
Kumar et al.

(10) Patent No.: US 11,710,312 B2
(45) Date of Patent: *Jul. 25, 2023

(54) SYSTEMS AND METHODS FOR DYNAMIC IMAGE CATEGORY DETERMINATION

(71) Applicant: Adobe Inc., San Jose, CA (US)

(72) Inventors: Jayant Kumar, San Jose, CA (US); Vera Lychagina, San Jose, CA (US); Tarun Vashisth, New Delhi (IN); Sudhakar Pandey, Sunnyvale, CA (US); Sharad Mangalick, San Francisco, CA (US); Rohith Mohan Dodle, Fremont, CA (US); Peter Baust, Sunnyvale, CA (US); Mina Doroudi, San Jose, CA (US); Kerem Turgutlu, San Jose, CA (US); Kannan Iyer, San Jose, CA (US); Gaurav Kukal, Fremont, CA (US); Archit Kalra, Fremont, CA (US); Amine Ben Khalifa, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,076

(22) Filed: Jul. 14, 2022

(65) Prior Publication Data

US 2022/0351513 A1    Nov. 3, 2022

Related U.S. Application Data

(63) Continuation of application No. 16/995,869, filed on Aug. 18, 2020, now Pat. No. 11,468,674.

(51) Int. Cl.
*G06V 20/00* (2022.01)
*G06F 16/53* (2019.01)
(Continued)

(52) U.S. Cl.
CPC .............. *G06V 20/35* (2022.01); *G06F 16/53* (2019.01); *G06F 18/214* (2023.01); *G06F 18/23* (2023.01); *G06N 3/08* (2013.01)

(58) Field of Classification Search
None
See application file for complete search history.

(56) References Cited

U.S. PATENT DOCUMENTS 11,468,674 B2 * 10/2022 Kumar ................... G06N 20/00
2019/0156122 A1    5/2019 Lu
(Continued)

OTHER PUBLICATIONS

"Pre-Interview First Office Action", U.S. Appl. No. 16/995,869, dated Apr. 7, 2022, 3 pages.
(Continued)

*Primary Examiner* — Leon Flores
(74) *Attorney, Agent, or Firm* — FIG. 1 Patents

(57) ABSTRACT

Disclosed are systems and methods for dynamically determining categories for images. A computer-implemented method may include training a neural network to receive an input image and determine one or more image categories associated with the input image; obtaining a set of images associated with a user; determining, using the trained neural network, one or more image categories associated with each image included in the obtained set of images; determining one or more dominant image categories associated with the user based on the determined image categories for the obtained set of images; and determining an image editing user interface for the user based on the determined one or more dominant image categories.

20 Claims, 13 Drawing Sheets

(51) Int. Cl.
*G06N 3/08* (2023.01)
*G06F 18/23* (2023.01)
*G06F 18/214* (2023.01)

(56) References Cited

U.S. PATENT DOCUMENTS

| | | |
|---|---|---|
| 2019/0220694 A1 | 7/2019 | Biswas et al. |
| 2020/0394441 A1 | 12/2020 | Wen et al. |
| 2022/0058391 A1 | 2/2022 | Kumar et al. |

OTHER PUBLICATIONS

U.S. Appl. No. 16/995,869, "Notice of Allowance", U.S. Appl. No. 16/995,869, dated Jun. 29, 2022, 8 pages.

\* cited by examiner

SYSTEMS AND METHODS FOR DYNAMIC IMAGE CATEGORY DETERMINATION

RELATED APPLICATIONS

This application is a continuation of and claims priority to U.S. patent application Ser. No. 16/995,869, filed Aug. 18, 2020, entitled "Systems and Methods for Dynamic Image Category Determination," the entire disclosure of which is hereby incorporated by reference herein in its entirety.

TECHNICAL FIELD

The present disclosure relates to systems and methods for dynamically determining categories for assets, and more particularly, to systems and methods for dynamically determining categories for images.

BACKGROUND

A photographer may typically work with photographs related to one or more preferred subject matter categories (i.e., genres), which may include landscapes, portraits, architecture, events, food, animals, fashion, cities, travel, macro, and so on. When working with an image of a particular genre, the photographer may utilize image editing tools, photography tools, and/or gears specific to that genre.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

Systems and methods are disclosed for dynamically determining one or more preferred subject matter categories of a user, based on classifying and analyzing various images associated with the user. Such systems and methods may provide a personalized experience for the user utilizing image related tools based on his or her preferred subject matter categories.

In one aspect, a computer-implemented method is disclosed. The computer-implemented method may include: training a neural network to receive an input image and determine one or more image categories associated with the input image; obtaining a set of images associated with a user; determining, using the trained neural network, one or more image categories associated with each image included in the obtained set of images; determining one or more dominant image categories associated with the user based on the determined image categories for the obtained set of images; and determining an image editing user interface for the user based on the determined one or more dominant image categories.

In another aspect, a computer system comprising at least one memory having processor-readable instructions stored therein; and at least one processor configured to access the memory and execute the processor-readable instructions to perform operations is disclosed. The operations may include: training a neural network to receive an input image and determine one or more image categories associated with the input image; obtaining a set of images associated with a user; determining, using the trained neural network, one or more image categories associated with each image included in the obtained set of images; determining one or more dominant image categories associated with the user based on the determined image categories for the obtained set of images; and determining an image editing user interface for the user based on the determined one or more dominant image categories.

In another aspect, a computer-implemented method is disclosed. The computer-implemented method may include: obtaining a set of images associated with each user of a plurality of users; determining, using a neural network, one or more categories for each image included in the obtained set of images for each user; determining a vector based on the categorized images for each user, thereby obtaining a plurality of vectors for the plurality of users, wherein each vector indicates one or more categories associated with each user; determining one or more clusters by clustering the plurality of vectors based on a predetermined number; determining a cluster mean for each of the determined one or more clusters; determining a category for each of the determined one or more cluster means based at least on the vectors included in the respective cluster; obtaining a query set of images associated with a query user; determining, using the neural network, one or more categories for each image included in the query set of images; determining a query vector based on the categorized images for the query user; and assigning the query user to one or more of the determined one or more clusters by comparing the query vector to one or more neighboring cluster means.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
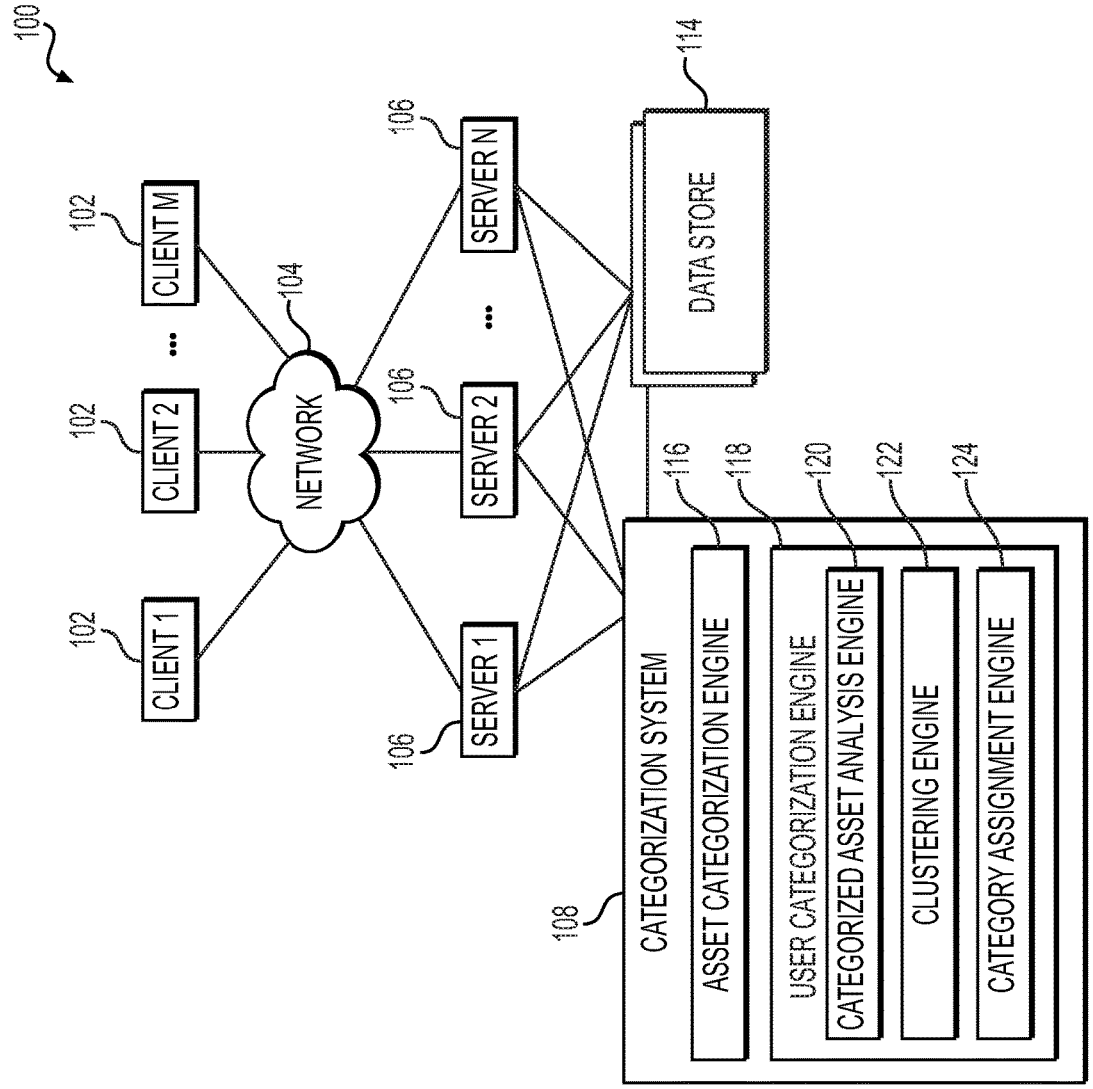
FIG. 1 depicts a schematic diagram illustrating an example of a computer network and environment within which the computer systems and methods disclosed herein are implemented, according to some embodiments of the present disclosure.

The following embodiments describe systems and methods for dynamically determining categories for assets and, more particularly, for dynamically determining categories for images.

With the proliferation of portable devices with image capturing capabilities, there has been a large increase in the number of image processing or editing applications in the market, each with their distinct tools and user interfaces. One feature that is extremely useful in modern image processing/editing applications is to classify images into different categories without or with minimal user intervention. While there may be different techniques for classifying images into categories, there is a constant need for classifying images more expeditiously and/or accurately. Further, a mechanism that can translate categorized images into meaningful insight about a particular user and/or a general population may help provide a better image processing/editing experience to consumers. For example, identification of one or more genres or subject matter preferred by a user may help provide better tools and products that can be used during the user's image capturing, processing, and/or editing experience.

The techniques disclosed in the present disclosure address one or more of the above challenges. Some embodiments are directed to dynamically determining one or more categories associated with images (i.e., hereinafter referred to as "image categories" or "categories") such as, e.g., photographs, images extracted from video frames, etc. Techniques for dynamically determining one or more image categories may be utilized to determine one or more image categories preferred by the user (hereinafter referred to as "dominant image categories" or "dominant categories"), as will be described in further detail below. By identifying such dominant image categories associated with the user, an image editing interface may be personalized for the user based on the determined one or more dominant image categories. For example, recommendations for relevant image editing tools, photography gear, related image editing tutorials, and/or related images may be generated or determined based on the determined one or more dominant image categories. Furthermore, additional image editing tools and/or tutorials may be developed based on the determined dominant image categories for several users. That is, trends may be detected based on the determined dominant image categories for users. Accordingly, development of new or enhanced image editing tools and/or tutorials may be focused on such trends. For example, there may be a detected trend of users working increasingly more with landscape images and moving away from astro images. In such instances, image editing interfaces may be configured to facilitate image editing for the landscape images by activating certain features suitable for adjusting the landscape images and/or deactivating features that may not be useful.

As will be described in further detail below, some embodiments disclosed herein are directed to utilizing one or more convolutional neural networks to determine categories associated with an image. Such image categories may comprise hierarchical categories including at least one high level category and one or more subcategories that branch out from the high level category. The determined image categories for a user (i.e., the categories determined for images associated with a user) may be aggregated to determine whether the user prefers one or more image categories relative to others. That is, one or more dominant image categories may be determined for the user based on the distribution of the image categories associated with the user.

The embodiments disclosed herein provide enhanced software application capabilities including, but not limited to: classifying user assets (e.g., photographs and other images that belong to or are otherwise associated with the user) into image categories and aggregating the determined image categories to determine an affinity of the user towards one or more specific image categories; providing high-level categories in addition to existing metadata to enhance image data within image storage and/or image editing tools; and providing image categories comprising hierarchical categories that include at least one high level category and one or more subcategories to the at least one high level category, thereby enabling both a high level and a granular level analysis.

FIG. 1 shows a block diagram of an exemplary electronic communications system 100 for implementing embodiments of the present disclosure, or aspects thereof. In general, the electronic communications system 100 may comprise clients 102, servers 106, data store 114, and categorization system 108, all connected with each other via network 104. The system 100 may include one or more clients 102 (e.g., Client 1, Client 2, . . . Client M). The clients 102 may be implemented with devices, and/or applications running thereon. By way of example, a client 102 may be any computing device consistent with or similar to that depicted in FIG. 11, including a personal computer, laptop, tablet computer, personal digital assistant, mobile telephone, smartphone, pager, and/or other types of electronic processing device. The clients 102 may be configured to communicate with other entities in the system 100 via the network 104. In the context of the current disclosure, a client 102 may represent a user using one or more of the aforementioned devices and/or applications. In certain embodiments, the network 104 may include any one or combination of communication networks. For example, the network 104 may include the Internet, but may also include other networks such as a wide area network, intranet, metropolitan area network, local area network, wireless network, cellular communications network, etc., or combination thereof. In some embodiments, the clients 102 may be configured to initiate electronic requests regarding images. For example, the electronic requests may include uploading (e.g., to data store 114) one or more images, modifying one or more images via an image editing user interface, accessing image editing services provided by the servers 106, etc. The electronic requests may be generated by the clients 102 and transmitted through the network 104 to appropriate servers such as, for example, the servers 106 and/or data store 114.

In some embodiments, an image may comprise any type of digital visual media. In the context of the current disclosure, the term "digital visual media" may refer to digital data capable of producing a visual representation. For example, digital visual media may include digital images and digital videos. In the context of the current disclosure, the term "digital image" may include a digital symbol, picture, icon, or illustration. For example, a digital image may include a digital file in any one of the following file formats: JPG, TIFF, BMP, PNG, RAW, or PDF.

The servers 106 may include one or more servers (e.g., Server 1, Server 2, . . . Server N) configured to interact with other entities illustrated in FIG. 1 via the network 104, such as the data store 114, categorization system 108, and clients 102. A server 106 may be implemented as a single server, a server system comprising a plurality of servers, or a server farm comprising a load balancing system and a plurality of servers. The servers 106 may comprise hardware, software, or a combination thereof. In some embodiments, a product and/or service may be provided to the clients 102 via the servers 106. For example, the servers 106 may host web-based and/or downloadable image editing software applications.

The categorization system 108 may include asset categorization engine 116 and user categorization engine 118. The asset categorization engine 116 may be configured to determine one or more categories associated with an image. In some embodiments, the asset categorization engine 116 may retrieve images from the data store 114 and determine the category for each of the retrieved images. The asset categorization engine 116 may employ neural network approaches (i.e., deep learning). A neural network may be implemented in software representing the human neural system (e.g., cognitive system). A neural network may include a series of layers comprising "neurons" or "nodes." A neural network may comprise an input layer to which data (e.g., an image) is presented, one or more internal layers (i.e., hidden layers), and an output layer. The number of neurons in each layer may depend on the complexity of a problem to be solved. Input neurons may receive data to be analyzed and then transmit the data to a first internal layer through connections carrying respective weights. The data may continue to be transformed as different layers perform different transformations on the inputs. The output layer may produce the ultimate result, which may be evaluated based on a loss/cost function in order to optimize the network. A neural network contemplated by the present disclosure may include a convolutional neural network, as will be described in further detail below with reference to Table 1.

The user categorization engine 118 may be configured to determine one or more dominant categories for a user based on the categories predicted by asset categorization engine 116. In some embodiments, the user categorization engine 118 may be further configured to determine an image editing user interface for the user based on the determined one or more dominant image categories. As shown in FIG. 1, the user categorization engine 118 may include categorized asset analysis engine 120, clustering engine 122, and category assignment engine 124. The categorized asset analysis engine 120 may determine data sets associated with predicted categories. For example, the categorized asset analysis engine 120 may determine a data set indicating one or more users, the set of images associated with each user, and the predicted category for each of the images. Further, the categorized asset analysis engine 120 may determine a distribution of predicted category counts for each user. The categorized asset analysis engine 120 may then normalize the determined distribution of predicted category counts for each user for further processing by the clustering engine 122, as will be described in further detail below with reference to FIG. 4.

The clustering engine 122 may be configured to cluster the normalized distribution of predicted category counts for each user. As will be described in further detail below with reference to FIG. 4, the clustering engine 122 may utilize any appropriate clustering method, for example, K-means clustering, density-based spatial clustering of applications with noise (DBSCAN), and/or affinity propagation (AP), to cluster the normalized distribution of predicted category counts.

The category assignment engine 124 may be configured to assign one or more dominant categories to each user based on the clusters determined by the clustering engine 122. As will be described in further detail below with reference to FIG. 4, the category assignment engine 124 may determine cluster means for the determined clusters and assign a category to each cluster mean. In some embodiments, the category assignment engine 124 may determine one or more dominant categories for a user by determining and comparing distances between a normalized distribution of predicted category counts for the user and the cluster means. For example, the category assignment engine 124 may assign the category assigned to the cluster mean that is the nearest distance from the normalized distribution of predicted category counts for the user as a dominant category.

Figure 2:
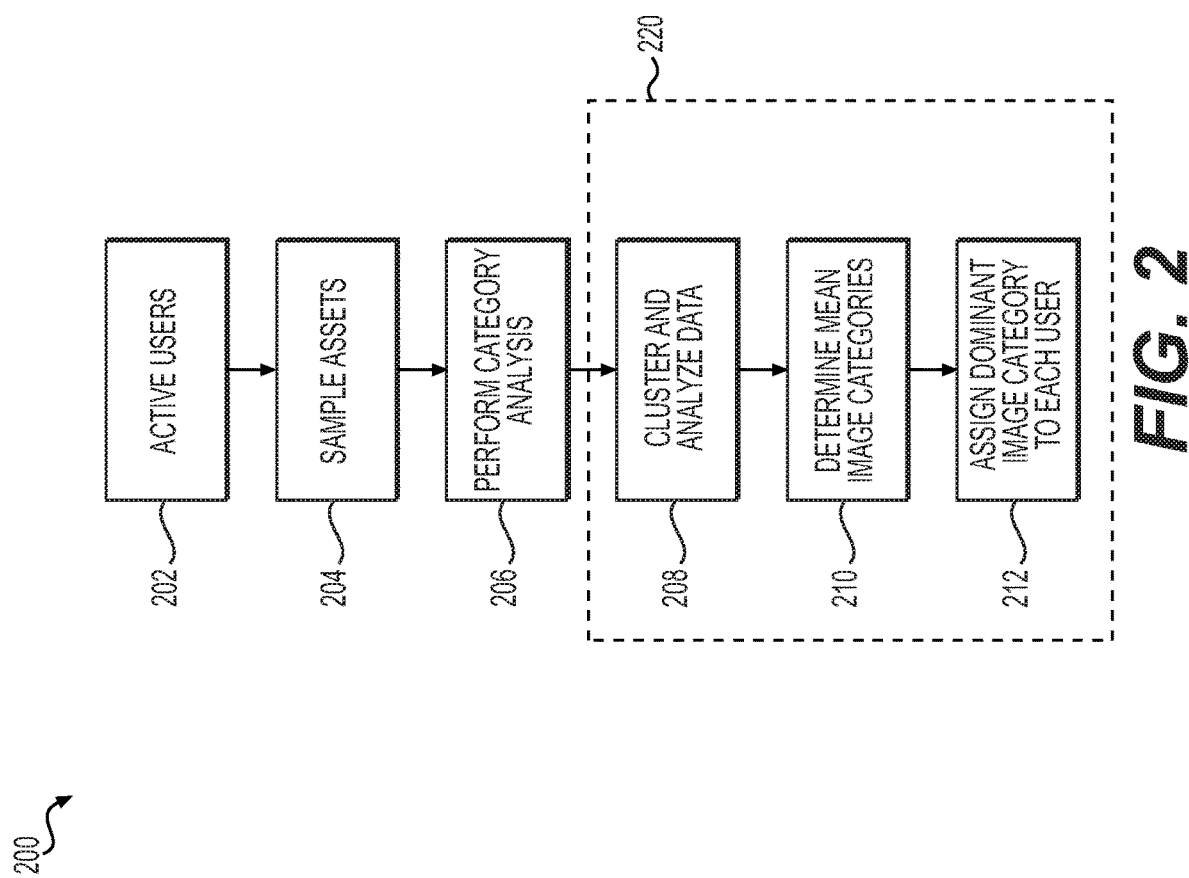
FIG. 2 depicts an exemplary method of dynamically determining categories associated with one or more users, according to some embodiments.

FIG. 2 is a flowchart illustrating an exemplary method of dynamically determining categories associated with one or more users, according to one aspect of the present disclosure. Method 200 may begin with step 202, in which active users (e.g., clients 102) may be determined. A user who has uploaded at least one asset (e.g., an image) to, for example, the data store 114, may be considered an active user. In some embodiments, a user who has uploaded at least one asset during a first period of time may be considered an active user. For example, a user who has uploaded at least one image in the past two months may be considered an active user.

In step 204, assets provided by the active users over a second period of time may be sampled. Assets (e.g., images) uploaded during the second period of time may be retrieved. In some embodiments, the retrieved assets may be sorted in any appropriate order, for example, chronological order. A predetermined percentage of the retrieved assets may be sampled for further processing. For example, images uploaded by a user in the past year may be retrieved. The retrieved images may be sorted in chronological order. In such instances, every fourth image of the sorted images may be sampled, thereby sampling approximately 25 percent of the images uploaded by the user in the past year. It should be noted that the retrieved images may be sorted in any appropriate manner and that any number or percentage of the retrieved images may be sampled. Also, in some embodiments, step 204 may be optional and all assets provided by the users (e.g., uploaded by the users) during any period of time may be retrieved and further processed in accordance with subsequent steps of method 200 (e.g., steps 206-212), which will be described in further detail below.

Figure 3A:
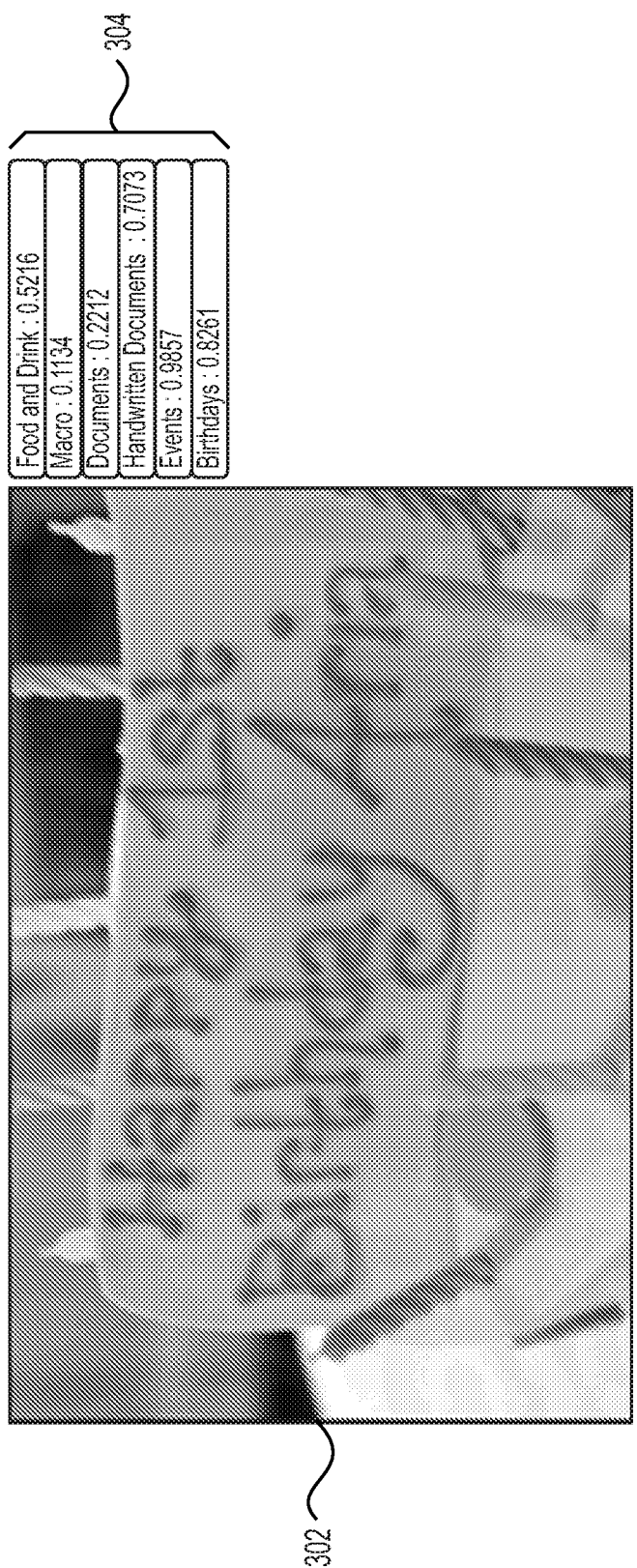
FIG. 3A depicts an image categorized by a neural network, according to some embodiments.

In step 206, a neural network such as, e.g., a convolutional neural network, may perform category analysis against the sampled assets. In other words, the neural network may predict one or more categories associated with each of the sampled assets. The neural network may be trained to predict one or more categories when an asset (e.g., image) is input to the neural network. In such embodiments, the trained neural network may further determine a confidence score for each of the one or more predicted categories for an asset. FIG. 3A depicts an image 302 categorized by the neural network, according to one aspect of the present disclosure. The neural network may receive image 302 as input and predict one or more categories 304 associated with the image 302. The neural network may also determine a confidence score for each of the predicted one or more categories 304. For example, the predicted categories 304 for image 302 may include: food and drink, macro, documents, handwritten documents, events, and birthdays. As shown in FIG. 3A, each predicted category may have an associated confidence score, for example, 0.5216 for food and drink, 0.1134 for macro, 0.2212 for documents, 0.7073 for handwritten documents, 0.9857 for events, and 0.8261 for birthdays. In some embodiments, the image 302, predicted categories 304, and associated confidence scores may be displayed to a user via, for example, an image editing user interface, as shown in FIG. 3A.

In some embodiments, the categories may include hierarchical categories including at least one high level category and one or more subcategories to the high level category. For simplicity, high level categories are referred to herein as level 1 categories and subcategories are referred to herein as level 2 categories. Exemplary level 1 categories may include: 1) Food and Drink; 2) Nature; 3) Landscapes; 4) Aerial; 5) Astro; 6) Animals; 7) Birds; 8) Fashion; 9) Abstract; 10) Buildings and Architecture; 11) Cities and Streets; 12) Documents; 13) Events; 14) Weddings; 15) Sports; 16) Travel; 17) Macro; 18) Portraits; and 19) Other. Exemplary level 2 categories may include subcategories to the level 1 categories. For example, level 2 categories for the level 1 category Landscapes may include: Mountains and Meadows; Seascapes; Lightning; Sunsets; and City Landscapes. As another example, level 2 categories for the level 1 category Astro may include: Deep Field; and Night Sky Milkyway. As another example, level 2 categories for the level 1 category Documents may include: Receipt; Whiteboard; Screenshot; Printed; Handwritten; and Scene Text Signs. As yet another example, level 2 categories for the level 1 category Events may include: Birthday; Business Activity; Graduation; Christmas; Halloween; Religious activity; Concerts and Shows; and Other Events. Level 1 and level 2 categories may be determined and updated periodically. It is understood that the number of categories for level 1 and level 2 may vary in other embodiments.

Figure 3B:
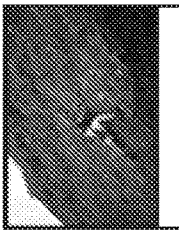
FIG. 3B depicts an exemplary user interface showing categories determined for images associated with a user, according to some embodiments.

FIG. 3B depicts an exemplary user interface showing categories determined for images associated with a user. In some embodiments, the displayed categories may include predicted categories based on images uploaded by the user. For example, a neural network may be configured to predict the categories associated with the uploaded images. The user interface 305 may be configured to display the predicted categories as being associated with the user, as shown in FIG. 3B. In some embodiments, the displayed categories may be level 1 categories, and a representative image may be selected and displayed along with each of the predicted level 1 categories. The representative image may be one of the uploaded images that have been categorized under the respective level 1 category. Additionally, the number of uploaded images that fall under each category may be displayed along with the representative image. It should be noted that the displayed categories may also be level 2 categories, or a combination of level 1 and level 2 categories in other embodiments. In some embodiments, the neural network may be unable to predict one or more categories for an image with a sufficient level of confidence. Such images may be categorized and displayed under "low confidence" group 306 as shown in FIG. 3B. In some embodiments, the neural network may be unable to categorize an image under predetermined categories, e.g., predetermined level 1 and level 2 categories. That is, categories for a certain image may not yet be available. Such images may be categorized and displayed under "uncategorized" group 307 as shown in FIG. 3B. In some embodiments, predetermined categories may be updated to include additional categories pertinent to such uncategorized images, and/or to remove one or more of the predetermined categories.

In some embodiments, the neural network designed to categorize images may include a convolutional neural network such as ResNet34, DenseNet131, ResNet50, or VGG. In some embodiments, the convolutional neural network may utilize a pooling layer in the final layers. For example, ResNet34 or VGG may include a pooling layer utilizing alpha-pooling technique. As explained above, such pooling layer may be added in the final layers of the convolutional neural network. In some embodiments, the neural network may be implemented using a deep learning library that may provide an interface to deep learning applications for vision, text, tabular data, time series, and collaborative filtering. For example, the deep learning library may be FastAI. In some embodiments, the neural network may be implemented using a deep learning framework such as Caffe or TensorFlow. Table 1 below provides an exemplary list of neural networks that may be used to categorize images, loss and activation functions used in the neural networks, and metrics used to evaluate the performance of the neural networks.

TABLE 1

| Neural Network | Loss/Activation | Metric |
| --- | --- | --- |
| ResNet34 (FastAl) | Cross-entropy/ | Average precision |
| DenseNet131 (FastAl) | Softmax | Average recall |
| ResNet50 + Alpha-pooling (Caffe) | Cross-entropy/ Hierarchical Softmax | Precision per class, Recall per class, |
| VGG + Alpha-pooling (Caffe) | Binary Cross Entropy/ Sigmoid | F-beta |

As alluded to above, the neural networks configured based on the settings provided in Table 1 may be evaluated for performance. For example, each neural network may be evaluated based on test data comprising approximately three thousand (3,000) images. An exemplary experiment showed that the neural network comprising ResNet50 with alpha-pooling added in final layers resulted in optimal accuracy for predicting image categories. Exemplary evaluation results for ResNet50 with alpha-pooling based on a plurality of test images are provided below in Table 2.

TABLE 2

| Number of test images | Average precision | Average Recall | Classification Accuracy |
| --- | --- | --- | --- |
| 2919 | 0.93 | 0.83 | 88% |

Figure 3C:
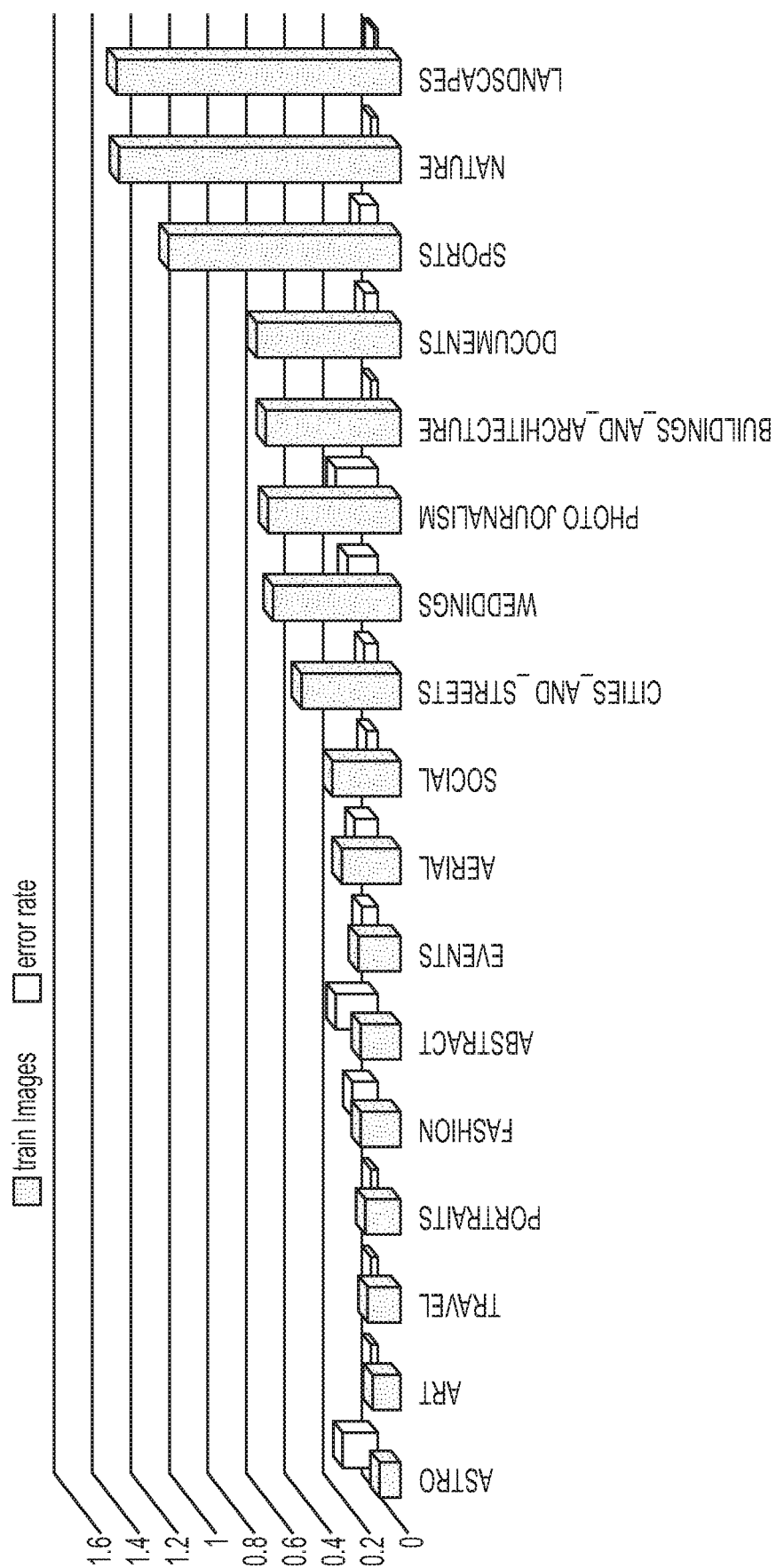
FIG. 3C provides a bar chart illustrating a prediction error rate for each predicted category, relative to a number of samples used to train the neural network, according to some embodiments.

FIG. 3C is a bar chart illustrating a prediction error rate for each predicted category, relative to the number of samples used to train the neural network. The chart shows that the number of training samples may have an effect on the prediction error rate. For example, the relatively high number of training images in the Landscapes, Nature, and Sports categories led to lower error rates. The neural network may have difficulty learning certain categories, for example, Astro and Abstract, due to the high variation and diversity of images included in such categories.

Referring back to step 206, in addition to performing the category analysis, a data set may be generated based on the results of steps 202, 204, and 206. Specifically, the data set may indicate the determined active users, the set of images associated with each user, and the predicted category for each image. The data set may be further processed by clustering and analyzing the data (step 208), determining mean image categories (step 210), and assigning at least one dominant image category to each user (step 212), as will be described in further detail below with reference to FIG. 4. For example, step 208 may correspond to steps 402-410, step 210 may correspond to step 412, and step 212 may correspond to step 414. As shown in FIG. 2, steps 208, 210, and 212 are collectively referred to herein as method 220.

Figure 4:
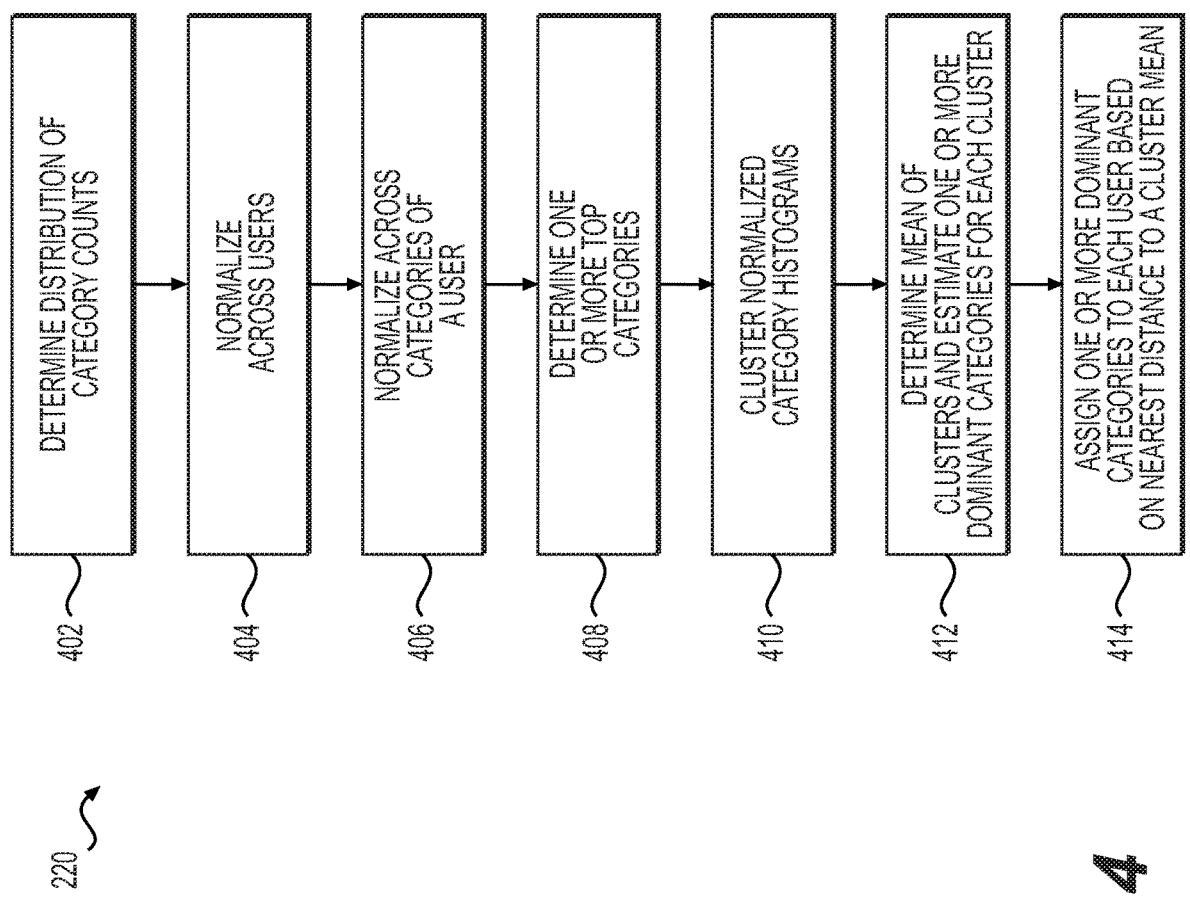
FIG. 4 depicts an exemplary method of assigning dominant image categories to a user based on a clustering technique, according to some embodiments.

FIG. 4 is a flowchart illustrating an exemplary method of assigning dominant image categories to a user utilizing a clustering technique, according to one aspect of the present disclosure. Method 220 may begin with step 402 in which a distribution of image counts across the predicted categories for each active user may be determined based on the data set (i.e., the data set generated in step 206 of method 200). For the sake of brevity, an image count associated with a category may be referred to herein as a "category count." As described above, the data set may indicate the determined active users, the set of images associated with each active user, and the predicted category for each image. An exemplary distribution of category counts across the predicted categories for each active user is provided below in Table 3. It should be noted that the distribution of category counts across the categories depicted in Table 3 is for the purpose of explanation only and that the number of categories, users, and images under each category may vary in other embodiments.

TABLE 3

| Categories | User 1 | User 2 | User 3 | User 4 | User 5 |
|---|---|---|---|---|---|
| Food and Drink | 118 | 466 | 237 | 292 | 305 |
| Nature | 282 | 949 | 1036 | 10054 | 1215 |
| Landscape | 24 | 1320 | 543 | 21627 | 3070 |
| Aerial | 0 | 32 | 7 | 841 | 246 |
| Astro | 212 | 16 | 8 | 306 | 59 |
| Animal | 2187 | 211 | 233 | 4003 | 1725 |
| Birds | 147 | 56 | 79 | 2299 | 620 |
| Fashion | 69750 | 7629 | 54757 | 18131 | 861 |
| Abstract | 48 | 111 | 245 | 1386 | 246 |
| Building and Architecture | 132 | 1327 | 157 | 9169 | 1301 |
| Cities | 110 | 1520 | 323 | 2828 | 1481 |
| Events | 18373 | 9765 | 4113 | 9413 | 8643 |
| Weddings | 4854 | 79433 | 6255 | 3096 | 1173 |
| Sports | 5534 | 155 | 2099 | 4081 | 62876 |
| Travel | 159 | 1390 | 1611 | 4339 | 1597 |
| Macro | 65 | 683 | 329 | 998 | 457 |
| Portraits | 34166 | 7646 | 56290 | 15512 | 10749 |

In step 404, the category counts may be normalized across the active users. Accordingly, a mean category count pertaining to all active users may be determined for each category. Referring to Table 3 above as an example, the category counts across User 1 through User 5 may be normalized to obtain a mean number of images for each category. For example, the mean category count for the "Food and Drink" category may be approximately 283.6 (i.e., the sum of all category counts determined for the "Food and Drink" category, divided by the number of active users).

In step 406, the category counts across the categories may be normalized for each active user. First, for each active user, the category counts determined for all the categories may be summed (e.g., 136161 for User 1). Then, a ratio of each category count to the sum may be determined for each active user (e.g., approximately 0.51 for the "Fashion" category of User 1). In some embodiments, the ratio may be expressed in percentage (%). The normalized values (i.e., the ratios or percentages) may be utilized to determine one or more dominant categories for each active user, as will be described in further detail below with reference to step 408.

Based on steps 404 and/or 406, a normalized distribution of category counts (also referred to as "normalized category histograms") per user may be determined. In some embodiments, step 406 may be optional and the normalized distribution of category counts may be obtained based solely on the normalized category counts across all users determined in step 404. In the context of the current disclosure, normalized values may indicate values that are converted to a same range for the purpose of clustering. For example, the amount of data points (e.g., category counts) for different users may vary. The varying number of data points for each user may be converted such that the normalized category counts for each user are in the same range to facilitate clustering, as will be described in further detail below.

In step 408, one or more top categories for each active user may be determined based on the normalized distribution of category counts. In the context of the current disclosure, the term "top categories" may refer to one or more categories with the highest category counts. Referring to Table 3 above as an example, the normalized value for User 5 may indicate that the "Sports" category has the highest percentage of category count. Accordingly, the top category for User 5 may be determined to be the "Sports" category. In some embodiments, more than one top categories may be determined for a user. Referring to Table 3 as another example, the normalized value for User 3 may indicate that the "Fashion" and "Portraits" categories may have the highest percentages of category counts. Accordingly, the top categories for User 3 may be determined to be the "Fashion" and "Portraits" categories. It should be noted that, while the top categories for the active users may be determined as early as in step 408 as discussed above, the top categories determined in step 408 may not represent the dominant categories of a user. As will be described in further detail below with reference to steps 410 through 414, dominant categories of a user may be determined based on photography behavior of an average user and an average category count of each category. In some embodiments, step 408 may be optional and method 220 may proceed from step 406 to step 410, without performing step 408.

In step 410, the normalized category histograms may be clustered. That is, the active users may be clustered based on each respective normalized distribution of category counts. In some embodiments, vectors may be generated based on the normalized distribution of category count for each active user, thereby obtaining a vector indicating the category count distribution for each active user. In some embodiments, K-means clustering may be utilized to cluster the normalized category counts of the active users. It is understood that any appropriate clustering method may be utilized to perform the clustering, for example, density-based spatial clustering of applications with noise (DBSCAN), affinity propagation (AP), etc. In some embodiments, the number of clusters may be empirically estimated.

Figure 5:
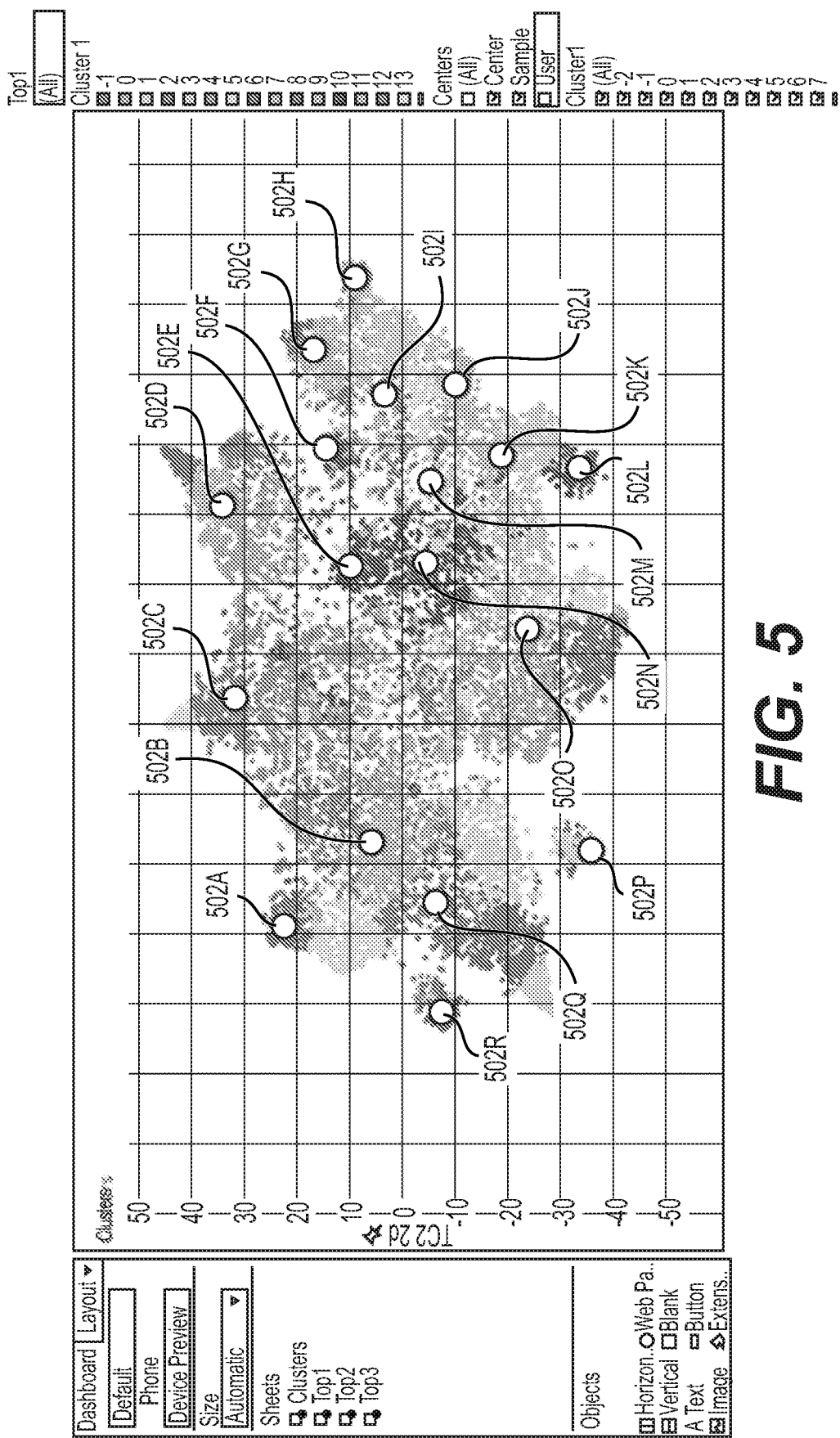
FIG. 5 provides an exemplary visualization of multiple clusters formed as a result of the clustering step, according to some embodiments.

FIG. 5 provides an exemplary visualization of multiple clusters formed as a result of the clustering step (i.e., step 410). As shown in FIG. 5, the various clusters may be visualized in a T-distributed Stochastic Neighbor Embedding (TSNE) space. It is understood that a TSNE space provides a visualization of high-dimensional data in a low-dimensional space of two or three dimensions. For example, each vector depicting the normalized distribution of category count for an active user may be presented as a dot on a two dimensional grid as shown in FIG. 5. Each vector may be considered high-dimensional due to the number of categories and category count distribution across the numerous categories that the vector represents for each active user. As shown in FIG. 5, each group of clustered dots may be depicted in varying shades of gray in the TSNE space to distinguish the different clusters.

Figure 6:
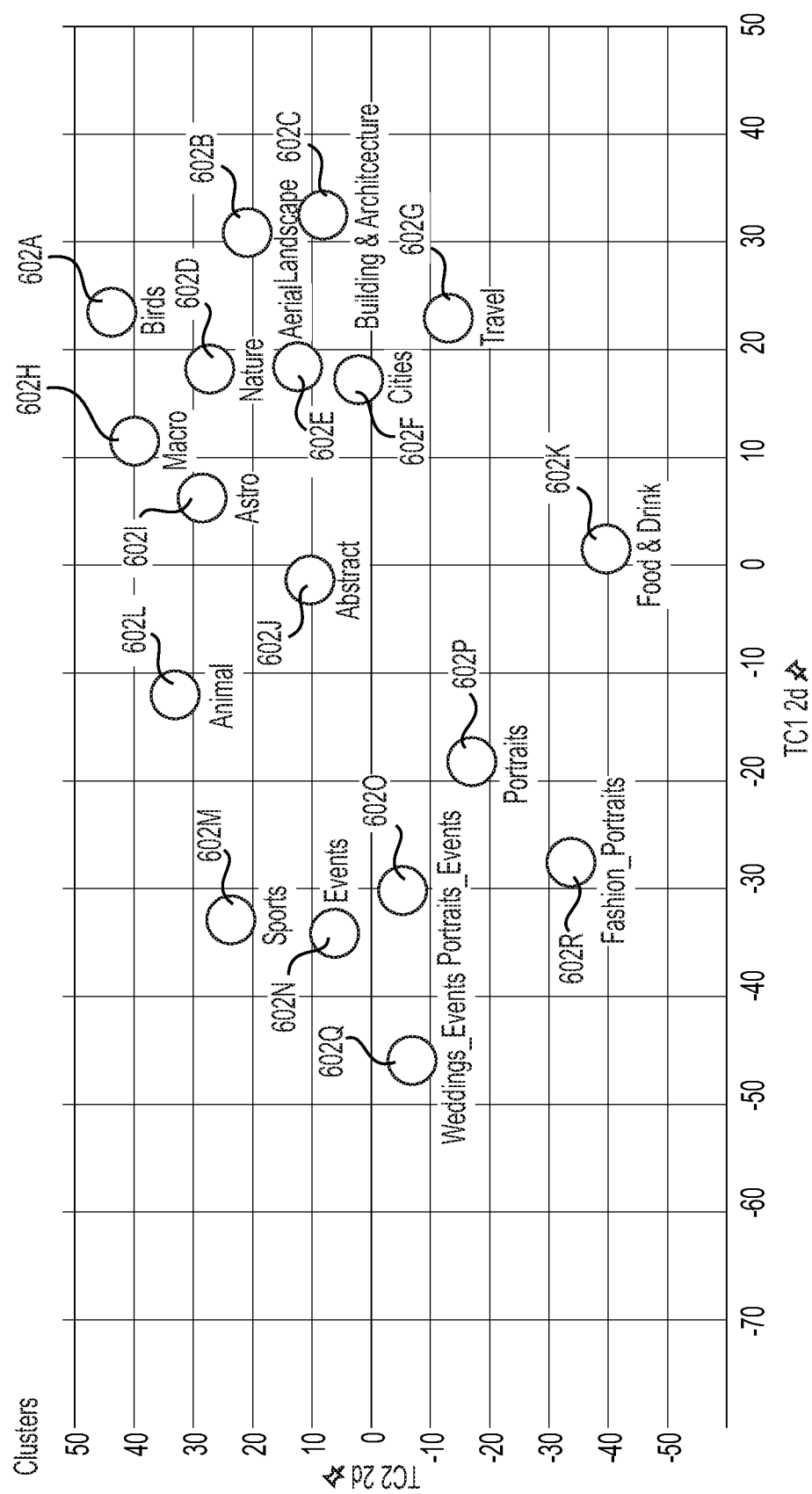
FIG. 6 provides an exemplary visualization of multiple cluster means according to some embodiments.

In step 412, the mean of each cluster may be determined and one or more dominant categories may be estimated for each cluster. A mean category count may be determined based on the normalized distribution of category counts of each cluster. The determined mean category counts (hereinafter referred to as "cluster means") are depicted as relatively larger dots 502A-502R in the TSNE space shown in FIG. 5. One or more dominant categories may then be estimated for each cluster. In some embodiments, the one or more dominant categories for each clusters may be estimated based on the dominant users in the clusters. For example, each cluster may have a plurality of users where a relatively high proportion of the users have overlapping top categories (also referred to as dominant users). In such instances, the one or more dominant categories for each cluster may be estimated at least based on the one or more top categories of the dominant users in the cluster. The estimated categories for the clusters may be assigned to each respective cluster mean, as shown in FIG. 6. FIG. 6 provides an exemplary visualization of multiple cluster means formed as a result of the clustering step (i.e., step 410), with one or more estimated categories assigned to each of the cluster means. In some embodiments, a single dominant category may be estimated for a cluster. For example, the estimated dominant category for a cluster associated with cluster mean 602A may be the "Birds" category as shown in FIG. 6. In some embodiments, more than one dominant categories may be estimates for a cluster. For example, the estimated dominant categories for a cluster associated with cluster mean 602O may be the "Portraits" and "Events" categories. Accordingly, both "Portraits" and "Events" categories may be assigned to cluster mean 602O as shown in FIG. 6.

Figure 7:
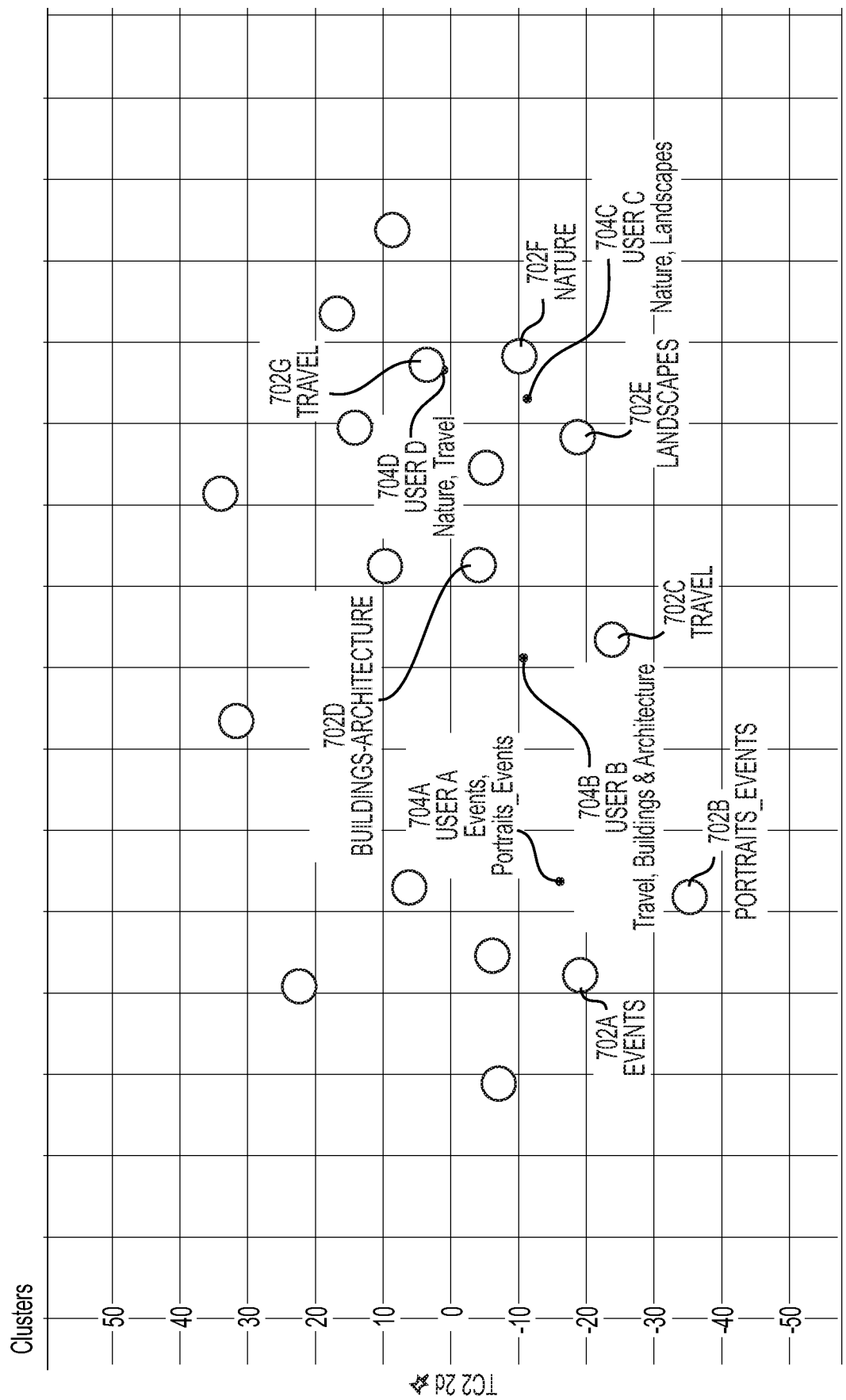
FIG. 7 provides an exemplary visualization of multiple cluster means and users, according to some embodiments.

In step 414, one or more dominant categories may be assigned to each active user based on a nearest distance to a cluster mean. As shown in FIG. 7, the normalized category count(s) for one or more users, e.g., users 704A-704D, may be depicted in the TSNE space. In some embodiments, the one or more users whose normalized category counts are depicted in the TSNE space may be the active users determined above. In some embodiments, each active user may be assigned to one or more clusters based on the distances between the user's normalized category count and the cluster means 702A-702G. For example, each active user may be assigned to one or more clusters based on a nearest distance to one or more cluster means. In other words, each active user may be assigned to one or more clusters that are closest to the user's normalized category count. The distance between each active user and the cluster means may be determined based on any appropriate distance measuring method such as, for example, Euclidian distance or Mahalanobis distance.

In the example of FIG. 7, User A 704A (i.e., the normalized category count 704A associated with User A) may be nearest to cluster mean 702A which has been assigned the "Events" category and cluster mean 702B which has been assigned the "Portraits_Events" categories. Accordingly, User A 704A may be assigned to each of the two clusters, thereby assigning the associated categories to User A 704A, as shown in FIG. 7. As such, it is determined that User A 704A prefers images associated with "Events" and "Portraits" categories. That is, the dominant categories for User A 704A are "Events" and "Portraits" categories. Similarly, the dominant categories may be determined for other users, e.g., User B 704B, User C 704C, and User D 704D. It should be noted that the number of dominant categories for each active user may be less than or more than two in other embodiments. For example, one dominant category may be assigned to a user based on one nearest cluster mean. As another example, three or more dominant categories may be assigned to a user based on three or more nearest cluster means.

Figure 8:
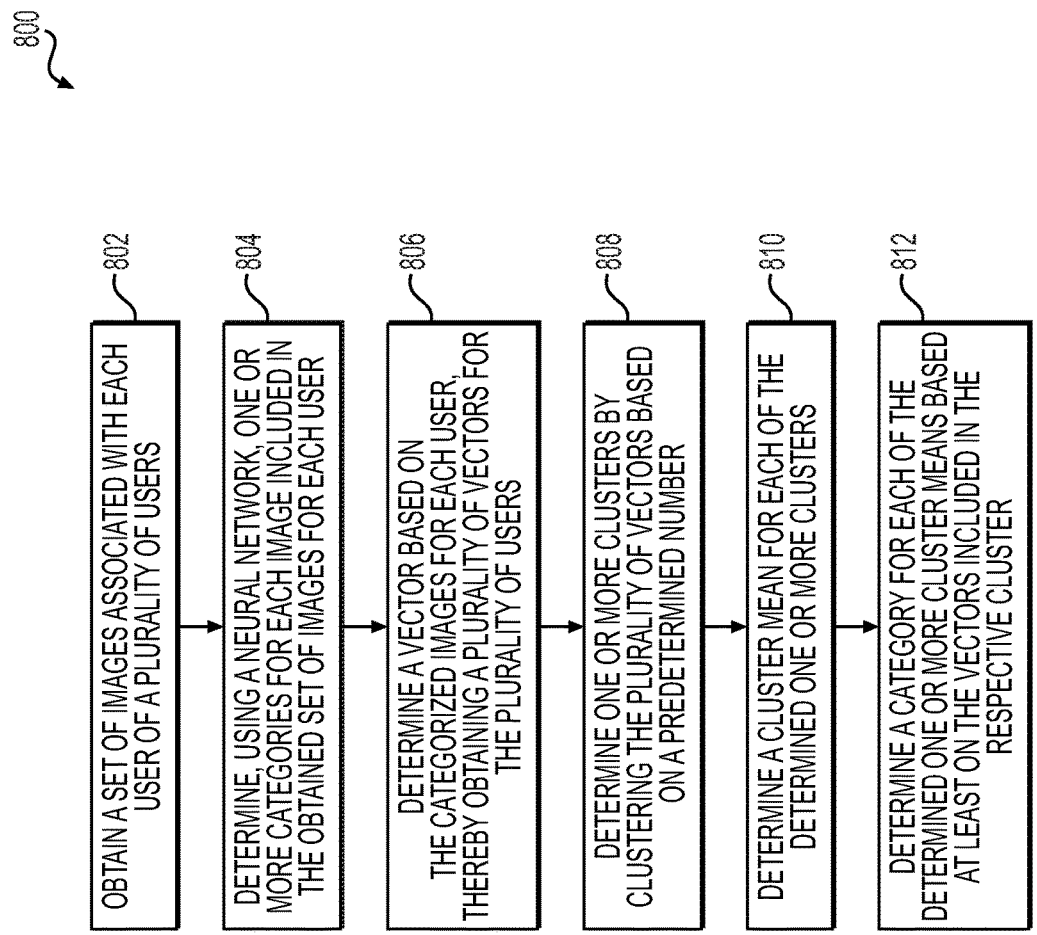
FIG. 8 depicts an exemplary method of determining categories for clusters, according to some embodiments.

FIG. 8 is a flowchart illustrating an exemplary method of determining categories for clusters, according to one aspect of the present disclosure. Method 800 may begin with step 802 in which a set of images associated with each user of a plurality of users may be obtained. In step 804, a neural network may be utilized to determine one or more categories for each image included in the obtained set of images for each user. In step 806, a vector for each user may be determined based on the categorized images associated with the user. Accordingly, a plurality of vectors for the plurality of users may be obtained. Each vector may indicate one or more categories associated with each user. In some embodiments, determining a vector based on the categorized images for each user may include determining a first mean number of categorized images under a first category for all of the plurality of users; determining a second mean number of categorized images under a second category for all of the plurality of users; and determining a vector for each user based at least on the determined first and second mean numbers. In some embodiments, determining a vector based on the categorized images for each user may include determining a first number of categorized images under a first category for a first user; determining a second number of categorized images under a second category for the first user; normalizing the first and second numbers; and determining a vector for the first user based at least on the normalized first and second numbers. In step 808, one or more clusters may be determined by the clustering the plurality of vectors based on a predetermined number. For example, the number of desired clusters may be determined based on a clustering method such as the K number of clusters for K-means clustering. In step 810, a cluster mean may be determined for each of the determined one or more clusters. In step 812, a category may be determined for each of the determined one or more cluster means based at least on the vectors included in the respective cluster.

In some embodiments, method 800 may include an additional step in which the neural network may be trained to receive an input image and determine one or more categories associated with the input image, as explained above. In some embodiments, the determined one or more categories may comprise hierarchical categories including at least one high level category and one or more subcategories to the high level category, as also explained above.

Figure 9:
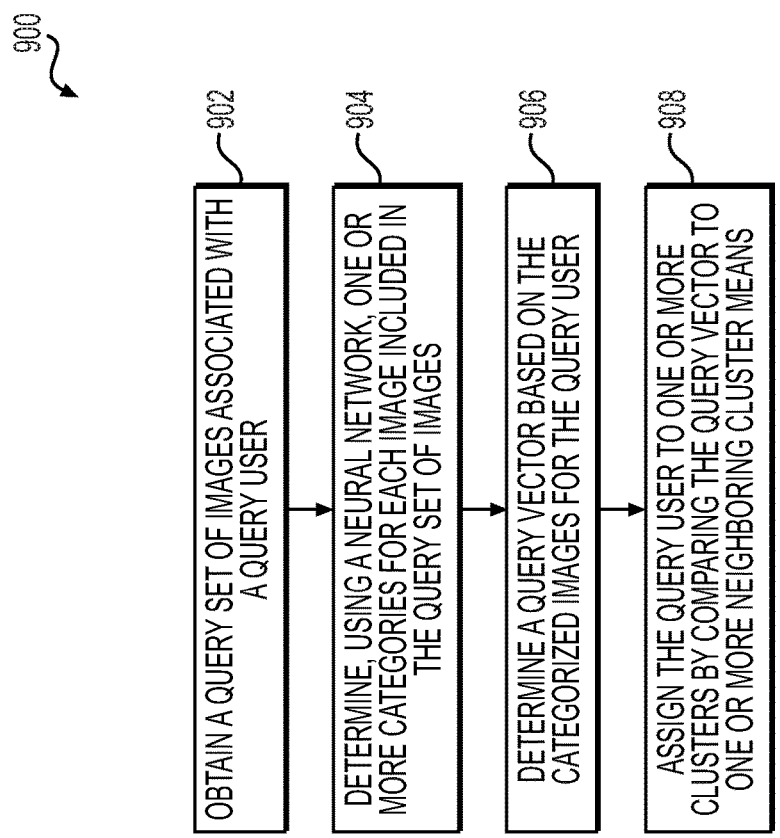
FIG. 9 depicts an exemplary method of assigning a user to one or more clusters, according to some embodiments.

FIG. 9 is a flowchart illustrating an exemplary method of assigning a user to one or more clusters, according to one aspect of the present disclosure. In some embodiments, method 900 may be an extension of method 800. For example, step 902 of method 900 may follow step 812 of method 800. Method 900 may begin with step 902 in which a query set of images associated with a query user may be obtained. In step 904, a neural network may be used to determine one or more categories for each image included in the query set of images. In step 906, a query vector may be determined based on the categorized images for the query user. In step 908, the query user may be assigned to one or more clusters by comparing the query vector to one or more neighboring cluster means. In some embodiments, assigning the query user to one or more clusters by comparing the query vector to one or more neighboring cluster means may include determining a first distance between the query vector and a first cluster mean of a first neighboring cluster; determining a second distance between the query vector and a second cluster mean of a second neighboring cluster; and assigning the query user to the first neighboring cluster if the first distance is less than the second distance. In some embodiments, assigning the query user to one or more clusters by comparing the query vector to one or more neighboring cluster means may include determining a distance between the query vector and a cluster mean of a neighboring cluster; comparing the determined distance to a predetermined distance; and assigning the query user to the neighboring cluster if the determined distance is less than the predetermined distance.

Figure 10:
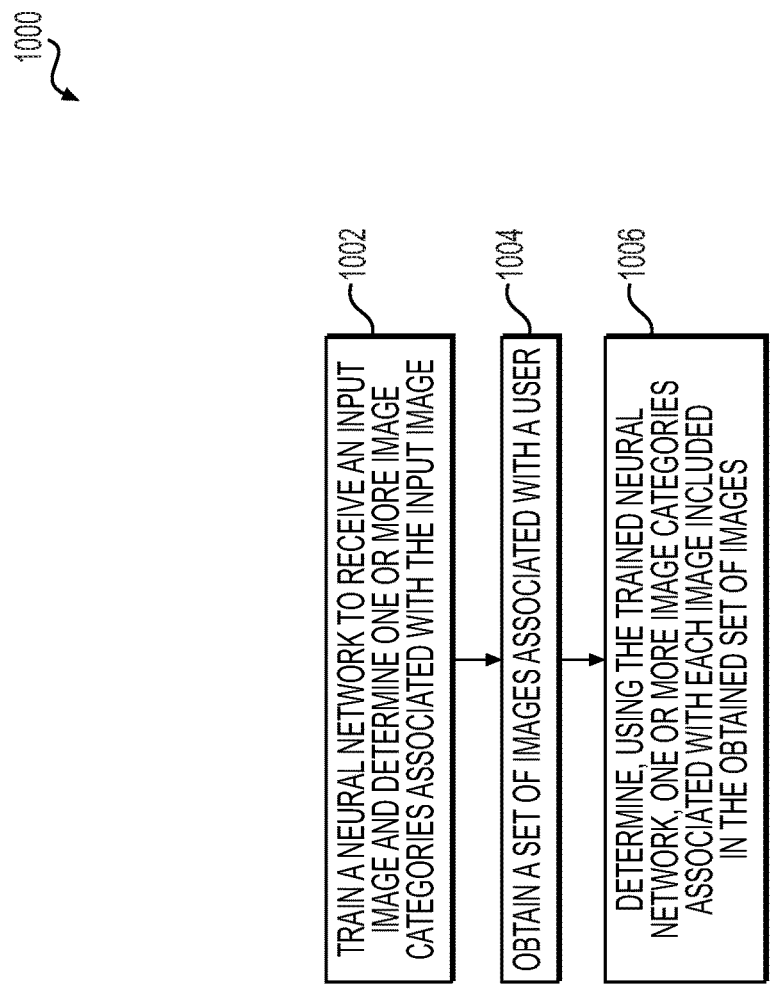
FIG. 10 depicts an exemplary method of determining an image editing user interface for a user based on dominant image categories, according to some embodiments.

FIG. 10 is a flowchart illustrating an exemplary method of determining an image editing user interface for a user based on dominant image categories, according to one aspect of the present disclosure. Method 1000 may begin with step 1002 in which a network may be trained to receive an input image and determine one or more image categories associated with the input image. In step 1004, a set of images associated with a user may be obtained. In some embodiments, obtaining the set of images associated with the user may include receiving a plurality of images associated with the user and sampling the received plurality of images to obtain the set of images. In step 1006, one or more image categories associated with each image included in the obtained set of images may be determined using the trained neural network. In some embodiments, the determined image categories for the obtained set of images comprise hierarchical categories including at least one high level category and one or more subcategories to the high level category. In step 1008, one or more dominant image categories associated with the user may be determined based on the determined image categories for the obtained set of images. In step 1010, an image editing user interface for the user may be determined based on the determined one or more dominant image categories.

In some embodiments, determining the image editing user interface for the user based on the determined one or more dominant image categories may include generating one or more image editing tool recommendations for the user based on the determined one or more dominant image categories. In some embodiments, determining the image editing user interface for the user based on the determined one or more dominant image categories may include determining one or more image editing tutorials for the user based on the determined one or more dominant image categories.

In some embodiments, method 1000 may include a further step in which the set of images may be displayed via the image editing user interface, wherein each image may be displayed with the associated one or more determined image categories. In some embodiments, method 1000 may include a further step in which the user may be notified of the determined one or more dominant image categories.

Figure 11:
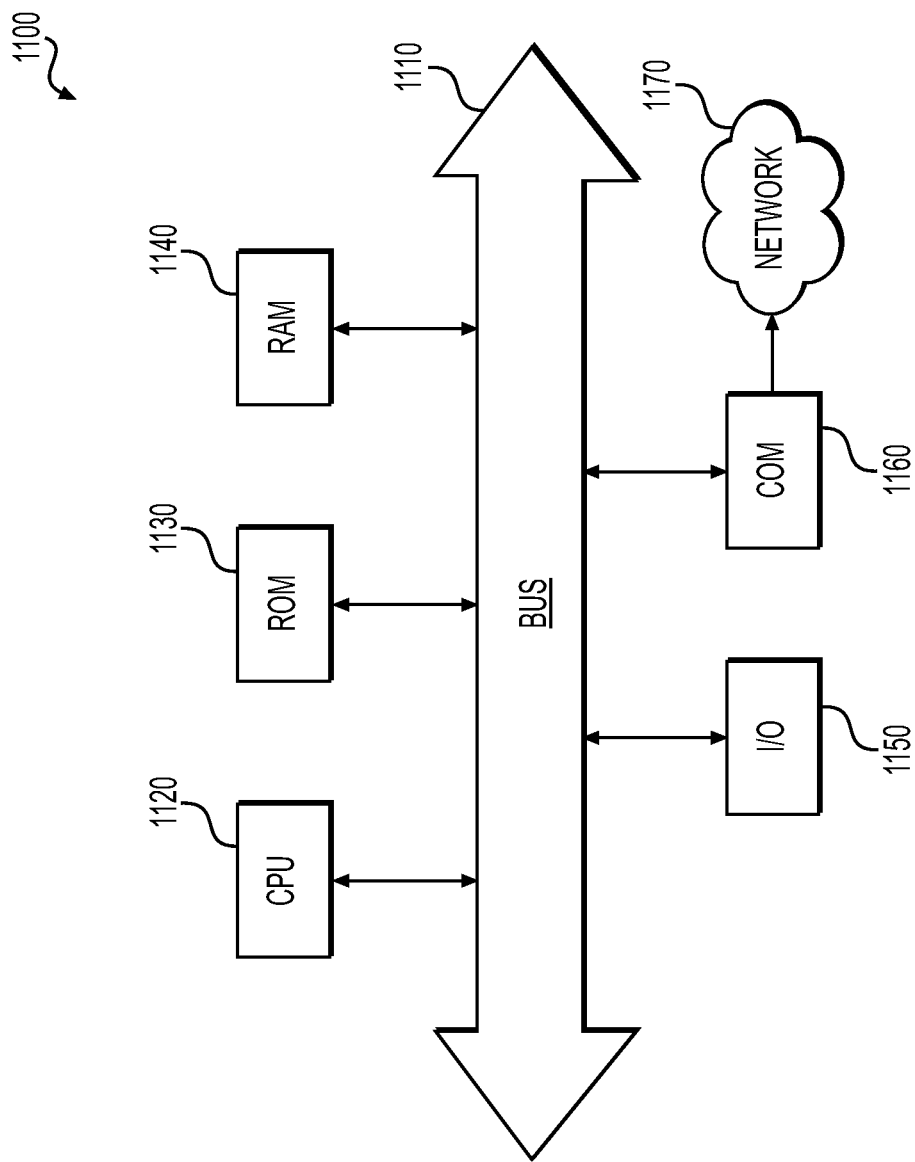
FIG. 11 provides a simplified functional block diagram of a computer configured to function according to exemplary embodiments of the present disclosure.

FIG. 11 provides a functional block diagram illustration of a general purpose computer hardware platform. FIG. 11 illustrates a network or host computer platform 1100, as may typically be used to implement a server, such as the one or more clients 102, servers 106, data stores 114, and the categorization system 108. It is believed that those skilled in the art are familiar with the structure, programming, and general operation of such computer equipment and, as a result, the drawings should be self-explanatory.

A platform for a server or the like 1100, for example, may include a data communication interface for packet data communication 1160. The platform may also include a central processing unit (CPU) 1120, in the form of one or more processors, for executing program instructions. The platform typically includes an internal communication bus 1110, program storage, and data storage for various data files to be processed and/or communicated by the platform such as ROM 1130 and RAM 1140, although the computer platform 1100 often receives programming and data via network communications 1170. The hardware elements, operating systems, and programming languages of such equipment are conventional in nature, and it is presumed that those skilled in the art are adequately familiar therewith. The computer platform 1100 also may include input and output ports 1150 to connect with input and output devices such as keyboards, mice, touchscreens, monitors, displays, etc. Of course, the various computer platform functions may be implemented in a distributed fashion on a number of similar platforms, to distribute the processing load. Alternatively, the computer platforms may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other communication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method comprising:
   training a neural network to receive an input image and determine one or more image categories associated with the input image;
   obtaining a set of images associated with a user;
   determining, using the trained neural network, one or more image categories associated with each image included in the obtained set of images;
   determining one or more dominant image categories associated with the user based on the determined image categories for the obtained set of images; and
   determining an image editing user interface for the user based on the determined one or more dominant image categories.

2. The computer-implemented method of claim 1, wherein obtaining the set of images associated with the user comprises:
   receiving a plurality of images associated with the user; and
   sampling the received plurality of images to obtain the set of images.

3. The computer-implemented method of claim 1, wherein the determined image categories for the obtained set of images comprise hierarchical categories including at least one high level category and one or more subcategories to the high level category.

4. The computer-implemented method of claim 1, wherein determining the image editing user interface for the user based on the determined one or more dominant image categories comprises:
   generating one or more image editing tool recommendations for the user based on the determined one or more dominant image categories.

5. The computer-implemented method of claim 1, wherein determining the image editing user interface for the user based on the determined one or more dominant image categories comprises:
   determining one or more image editing tutorials for the user based on the determined one or more dominant image categories.

6. The computer-implemented method of claim 1, further comprising:
   displaying the set of images via the image editing user interface, wherein each image is displayed with the associated one or more determined image categories.

7. The computer-implemented method of claim 1, further comprising:
   notifying the user of the determined one or more dominant image categories.

8. A computer system comprising:
   at least one memory having processor-readable instructions stored therein; and
   at least one processor configured to access the memory and execute the processor-readable instructions to perform operations comprising:
   training a neural network to receive an input image and determine one or more image categories associated with the input image;
   obtaining a set of images associated with a user;
   determining, using the trained neural network, one or more image categories associated with each image included in the obtained set of images;
   determining one or more dominant image categories associated with the user based on the determined image categories for the obtained set of images; and
   determining an image editing user interface for the user based on the determined one or more dominant image categories.

9. The computer system of claim 8, wherein obtaining the set of images associated with the user comprises:
   receiving a plurality of images associated with the user; and
   sampling the received plurality of images to obtain the set of images.

10. The computer system of claim 8, wherein the determined image categories for the obtained set of images comprise hierarchical categories including at least one high level category and one or more subcategories to the high level category.

11. The computer system of claim 8, wherein determining the image editing user interface for the user based on the determined one or more dominant image categories comprises:
    generating one or more image editing tool recommendations for the user based on the determined one or more dominant image categories.

12. The computer system of claim 8, wherein determining the image editing user interface for the user based on the determined one or more dominant image categories comprises:
    determining one or more image editing tutorials for the user based on the determined one or more dominant image categories.

13. The computer system of claim 8, wherein the operations further comprise:
    displaying the set of images via the image editing user interface, wherein each image is displayed with the associated one or more determined image categories.

14. A computer-implemented method comprising:
    obtaining a set of images associated with each user of a plurality of users;
    determining, using a neural network, one or more categories for each image included in the obtained set of images for each user;
    determining a vector based on the categorized images for each user, thereby obtaining a plurality of vectors for the plurality of users, wherein each vector indicates one or more categories associated with each user;
    determining one or more clusters by clustering the plurality of vectors based on a predetermined number;
    determining a cluster mean for each of the determined one or more clusters;
    determining a category for each of the determined one or more cluster means based at least on the vectors included in the respective cluster;
    obtaining a query set of images associated with a query user;
    determining, using the neural network, one or more categories for each image included in the query set of images;
    determining a query vector based on the categorized images for the query user; and assigning the query user to one or more of the determined one or more clusters by comparing the query vector to one or more neighboring cluster means.

15. The computer-implemented method of claim 14, further comprising:
   training the neural network to receive an input image and determine one or more categories associated with the input image.

16. The computer-implemented method of claim 14, wherein the determined one or more categories for each image comprise hierarchical categories including at least one high level category and one or more subcategories to the high level category.

17. The computer-implemented method of claim 14, wherein determining the vector based on the categorized images for each user comprises:
   determining a first mean number of categorized images under a first category for all of the plurality of users;
   determining a second mean number of categorized images under a second category for all of the plurality of users; and
   determining a vector for each user based at least on the determined first and second mean numbers.

18. The computer-implemented method of claim 14, wherein determining the vector based on the categorized images for each user comprises:
   determining a first number of categorized images under a first category for a first user;
   determining a second number of categorized images under a second category for the first user;
   normalizing the first and second numbers; and
   determining a vector for the first user based at least on the normalized first and second numbers.

19. The computer-implemented method of claim 14, wherein assigning the query user to the one or more of the determined one or more clusters by comparing the query vector to the one or more neighboring cluster means comprises:
   determining a first distance between the query vector and a first cluster mean of a first neighboring cluster;
   determining a second distance between the query vector and a second cluster mean of a second neighboring cluster; and
   assigning the query user to the first neighboring cluster if the first distance is less than the second distance.

20. The computer-implemented method of claim 14, wherein assigning the query user to the one or more of the determined one or more clusters by comparing the query vector to the one or more neighboring cluster means comprises:
   determining a distance between the query vector and a cluster mean of a neighboring cluster;
   comparing the determined distance to a predetermined distance; and
   assigning the query user to the neighboring cluster if the determined distance is less than the predetermined distance.

\* \* \* \* \*